United States Patent
Chatta et al.

[11] Patent Number: 5,866,498
[45] Date of Patent: Feb. 2, 1999

[54] COMPOSITE CATALYSTS FOR HYDROCARBON OXIDATION

[75] Inventors: Mohinder S. Chatta, Northville; Somasundaram Subramanian, Melvindale, both of Mich.; William L. H. Watkins, Toledo, Ohio

[73] Assignee: Ford Global Technologies, Inc., Dearborn, Mich.

[21] Appl. No.: 952,060

[22] Filed: Sep. 28, 1992

[51] Int. Cl.[6] .............................. B01J 23/10; B01J 23/16; B01J 8/02

[52] U.S. Cl. ..................... 502/303; 502/305; 502/306; 423/213.5

[58] Field of Search .................... 502/303, 306; 423/213.5

[56] References Cited

U.S. PATENT DOCUMENTS

| | | | |
|---|---|---|---|
| 3,901,828 | 8/1975 | Mai et al. | 252/462 |
| 3,905,918 | 9/1975 | Mai et al. | 252/462 |
| 3,956,186 | 5/1976 | Iwase et al. | 252/455 |
| 4,036,784 | 7/1977 | Gembicki et al. | 252/465 |
| 4,324,645 | 4/1982 | Angevine et al. | 208/50 |
| 4,374,103 | 2/1983 | Gandhi et al. | 423/213.5 |
| 4,492,769 | 1/1985 | Blanchard et al. | 502/262 |
| 4,500,650 | 2/1985 | Wyatt et al. | 502/204 |
| 4,508,691 | 4/1985 | Adams et al. | 423/213.5 |
| 4,749,671 | 6/1988 | Saito et al. | 502/64 |
| 4,929,585 | 5/1990 | Lee et al. | 502/220 |
| 4,931,419 | 6/1990 | Blanchard et al. | 502/304 |
| 4,957,896 | 9/1990 | Matsumoto et al. | 502/304 |

OTHER PUBLICATIONS

"Surface Area Determination of Supported Oxides: $WO_3/Al_2O_3$", R.L. Brady, et al, Journal of Catalysis 129, 195–201 (1991).

*Primary Examiner*—Ponnathapura Achutamurthy
*Attorney, Agent, or Firm*—Lorraine S. Melotik; Roger L. May

[57] ABSTRACT

The present invention broadly relates to a catalyst for promoting the oxidation-reduction reactions of the exhaust gases produced by an internal combustion engine wherein the catalyst comprises; tungsten oxide, a basic metal oxide, and a noble metal. More narrowly, the present invention relates to a catalyst for promoting oxidation-reduction reactions with the exhaust gases produced by internal combustion engine wherein the catalyst comprises; a composite oxide comprised of a refractory oxide, tungsten oxide in juxtaposed relation with the refractory oxide, and a basic metal oxide in juxtaposed relation with the tungsten oxide; and arrayed on the composite oxide a noble metal.

11 Claims, No Drawings

COMPOSITE CATALYSTS FOR HYDROCARBON OXIDATION

TECHNICAL FIELD

This application relates to composite catalysts for promoting oxidation-reduction reactions with the exhaust gases produced by an internal combustion engine, a process for making the catalysts of the invention, and a process for reducing the emission of such exhaust gases utilizing the composite catalysts.

BACKGROUND ART

The manufacturers and users of internal combustion engines have long sought an efficient and cost effective method to reduce the emissions of certain exhaust gases produced by such engines. Automobile manufacturers have addressed the problem with the incorporation of catalytic converters which promote the oxidation-reduction of undesirable gases such as hydrogen, carbon monoxide, hydrocarbons such as linear and branched alkanes, alkenes, aromatics, and nitrogen oxides, sulfurdioxide, water vapor and mixtures thereof.

In general, motor vehicle exhaust gases are passed over or through a body containing one or more substances which act as catalysts for the desired reactions. Catalysts which are able to promote the oxidation of hydrocarbons and carbon monoxide as well as the reduction of nitrogen oxides are known as Three Way Catalysts (TWC). Whether oxidation or reduction is the prevalent reaction in such catalysts is a function of the stoichiometry of the air/fuel ratio. In air-rich fuel mixtures, oxidation reactions will dominate, while fuel-rich feed mixtures encourage reduction.

As the following discussion of the prior art indicates, much effort has been directed toward the formulation of efficient, low cost catalysts which are capable of withstanding normal automobile operating conditions.

While the catalytic activity of the noble metals has long been known by those skilled in the art, several prior art patents have attempted to increase their catalytic activity and efficiency. Many of these attempts have centered on the addition of one or more metals to the noble metals to achieve multi-metallic catalysts. For example, U.S. Pat. No. 4,036,784, issued to Gembicki et al., and U.S. Pat. No. 4,324,645, issued to Angevine et al., herein incorporated by reference, both disclose catalyst compositions and/or processes of using such wherein the catalysts include combinations of Group VIB and Group VIII metals.

More particularly, U.S. Pat. No. 4,374,103, issued to Gandhi et al., and U.S. Pat. No. 4,500,650, issued to Wyatt et al., herein incorporated by reference, disclose the addition of tungsten containing compounds to respectively increase the catalytic activity of palladium and the platinum group metals.

However, under normal operating conditions, such catalysts may reach operating temperatures between 300° to 1200° C. Tungsten oxide from these catalysts is lost at temperatures as low as 800° C. As a result, such prior art catalysts will be prematurely depleted of tungsten oxide.

Thus, although the prior art was able to produce Three Way Catalysts having increased activity, such prior art catalysts are not suitable for commercialization due to the volatility of the tungsten oxide and the corresponding depletion of such under normal operating conditions. Such problems are particularly acute in motor vehicles such as trucks which normally have catalyst operating temperatures in the 700°–1000° C. range.

The instant invention has addressed the deficiencies in the prior art by incorporating basic metal oxides which act to surface stabilize the tungsten oxide. Although not wishing to be bound to a particular theory, it is believed that this stabilization occurs as a result of the interaction of the basic metal oxide with the acidic tungsten oxide. In addition, it has been found that the catalysts of the instant invention have increased activity for the oxidation of hydrocarbon gases.

While various prior art patents, including U.S. Pat. Nos. 4,500,650; 4,749,671; and 4,931,419; herein incorporated by reference, disclose the addition of various metal oxides to noble metal catalysts containing tungsten, nowhere does the prior art teach that the addition of basic metal oxides will stabilize the acidic tungsten oxide and thereby decrease the volatility. The prior art has neither addressed nor solved the problem of tungsten oxide sublimation under normal catalyst operating conditions.

Accordingly, it is an object of the invention to produce a commercially feasible catalyst which is both efficient and cost effective.

It is a further object of the invention to provide an exhaust gas catalyst which has the increased catalytic activity of a tungsten modified noble metal catalyst but which is stable and nonvolatile at the operating temperatures normally encountered by an exhaust gas catalyst used in a motor vehicle.

It is another object of the invention to provide a catalyst which exhibits increased catalytic activity for the oxidation of hydrocarbons.

It is a further object of the invention to provide a process of making the catalyst of the invention.

Finally, it is an object of the invention to provide a process for reducing the emission of exhaust gases produced by an internal combustion engine utilizing the catalyst of the invention.

SUMMARY OF THE INVENTION

The present invention broadly relates to a catalyst for promoting oxidation-reduction reactions with the exhaust gases produced by an internal combustion engine wherein said catalyst comprises tungsten oxide, a basic metal oxide, and a noble metal.

Further, the present invention relates to a catalyst for promoting oxidation-reduction reactions with the exhaust gases produced by internal combustion engine wherein the catalyst comprises; a composite oxide comprised of a refractory inorganic oxide, tungsten oxide in juxtaposed relation with the refractory inorganic oxide, and a basic metal oxide in juxtaposed relation with the tungsten oxide; and arrayed on the composite oxide a noble metal.

BEST MODE FOR CARRYING OUT THE INVENTION

The present invention solves the deficiencies of the prior art by providing an exhaust gas catalyst which has the increased catalytic activity of a tungsten modified noble metal catalyst but which is stable and non-volatile at the operating temperatures normally encountered by an exhaust gas catalyst used in a motor vehicle. The invention further presents an improvement over the prior art by virtue of the fact that the catalysts of the invention exhibit increased catalytic activity for hydrocarbon oxidation.

Thus, in its broadest sense the invention provides a catalyst for promoting oxidation-reduction reactions with the exhaust gases produced by an internal combustion engine comprising tungsten oxide, a basic metal oxide, and a noble metal. More narrowly, the invention relates to a composite oxide and a noble metal arrayed thereon wherein the composite oxide is comprised of a refractory inorganic oxide, tungsten oxide in juxtaposed relation with the refractory inorganic oxide, and a basic metal oxide in juxtaposed relation with the tungsten oxide.

While those skilled in the art will appreciate that the catalyst of the instant invention may be arrayed on such substrates as are well known in the art, the use of such is not necessary to the practice of the invention. As illustrated by the examples contained herein, the catalyst of the invention may function using a refractory inorganic oxide as the support.

In such a preferred embodiment, the refractory inorganic oxide, the tungsten oxide and the basic metal oxide may be viewed as a composite oxide upon which the noble metal is arrayed.

Suitable refractory inorganic oxides are alumina, silica, ceria, zirconia, thoria, magnesia, titania and the like. Also suitable are mixtures thereof such as silica-alumina, silica-zirconia, silica-titania, alumina-zirconia, alumina-titania, titania-zirconia, and zeolite.

Preferably, however, the refractory inorganic oxide is alumina and most preferably is gamma-alumina. Gamma alumina is most preferred because it has a small particle size and a correspondingly large surface area typically in the 50–400 m$^2$/g range. Such properties are advantageous in that they contribute to increased activity of the catalyst.

The catalyst of the instant invention utilizes the refractory inorganic oxide as a support. As discussed by Brady et al. in *Surface Area Determination of Supported Oxides*: WO$_3$/Al$_2$O$_3$, JOURNAL OF CATALYSIS, Vol. 129, pp. 195–201 (1991), herein incorporated by reference, it is believed that successive impregnation with the various catalyst components wets the underlying surface to form cluster compounds. Although not wishing to be bound to any particular theory it is believed that each additional component occupies pore spaces in the previously deposited component(s). However, it is also believed that in some cases the most recently added component will rise above the surface and pores of the previously laid down components to form three dimensional clusters. Accordingly, the term "in juxtaposed relation" is herein defined to encompass all such spatial relationships of one component to those components preceding and succeeding it in the order of impregnation or adsorption.

The tungsten oxide should be present in an amount equal to 1 to 30 percent by weight of the refractory inorganic oxide support. Preferably the amount will be from 1 to 20 weight percent and most preferably will be from 5 to 15 weight percent of the refractory inorganic oxide.

Suitable tungsten oxide precursors include tungsten salts soluble in aqueous or organic solvents. Examples include ammonium meta tungstate, meta tungstic acid and ortho tungstic acid. Formation of the desired tungsten oxide may be achieved with calcination as described in the examples contained herein.

The basic metal oxides utilized herein may be defined as those metal oxides that are substantially more basic (or less acidic) than tungsten oxide. The relative acidity and basicity may be quantified using the point of zero charge (pzc) or $pH_{pzc}$.

The $pH_{pzc}$ may be determined by preparing a series of aqueous metal oxide suspensions with increasing ratios of solid metal oxide to water. After letting the suspensions equilibrate for between 12 to 72 hours, preferably 24 hours, the pH of each suspension is measured. A plot of pH versus metal oxide to water ratio is constructed. This plot shows a plateau at higher oxide/water ratios. The value of this horizontal plateau region is the $pH_{pzc}$ or point of zero charge. The $pH_{pzc}$ for tungsten oxide has been determined to be 4.08. See Brady et al.

The instant invention addresses the prior art problems of tungsten oxide volatility and sublimation by incorporating metal oxides having $pH_{pzc}$ values substantially greater than that of tungsten oxide, i.e. basic metal oxides. In general, only those metal oxides having $pH_{pzc}$ values greater than 6.0 are suitable for incorporation into the instant invention as basic metal oxides. While alumina has a $pH_{pzc}$ of 7.43 and cerium oxide a $pH_{pzc}$ of 6.59, such metal oxides are generally not suitable for incorporation herein as compared to basic metal oxides such as barium oxide and lanthanum oxide having respective $pH_{pzc}$ values of 12.49 and 10.34. $pH_{pzc}$ values less than 6.0 have insufficient basicity to adequately stabilize the tungsten oxide.

However, any metal oxide having the requisite $pH_{pzc}$ greater than tungsten oxide is suitable for use as the basic metal oxide, as long as it is not a catalyst poison. Accordingly, while those in the art will appreciate that several metal oxides are within this definition, it has been discovered that the rare earth oxides and the alkaline metal earth oxides have such values and accordingly are preferred basic metal oxides. Most preferably, the basic metal oxide used herein will be lanthanum oxide. Suitable lanthanum oxide precursors are those lanthanum salts soluble in aqueous or organic solvents. Examples include lanthanum oxalate, lanthanum acetate, lanthanum nitrate, lanthanum chloride and lanthanum isopropoxide.

While not wishing to be bound to any particular theory, it is believed that the degree of contact between the basic metal oxide and tungsten oxide affects the surface stabilization of the tungsten oxide. Accordingly, while some of the basic metal oxide may be present in the refractory inorganic oxide discussed above, it should generally be present in the refractory oxide in no greater than about 35 weight percent of the total weight of basic metal oxide. Most preferably, the majority of the basic metal oxide will be deposited after the tungsten oxide and positioned so as to be in juxtaposed relation with the tungsten oxide.

Although those skilled in the art will appreciate that some refractory inorganic oxides may have $pH_{pzc}$ greater than tungsten oxide and so may act to participate in the stabilization of the tungsten oxide, the tungsten oxide must be contacted with a basic metal oxide as described herein, in addition to the refractory inorganic oxide. It is believed that sequential contact of the tungsten oxide with the basic metal oxide is necessary for the requisite surface stabilization of the tungsten oxide. Without such surface stabilization, it is believed that the tungsten oxide will not exhibit the decrease in volatility sought to be achieved by the instant invention.

The basic metal oxide should be present in an amount of 30 to 100 percent by weight of the tungsten oxide but in no case should be less than three percent by weight of the refractory inorganic oxide. The lower limit of no less than three percent by weight of the refractory inorganic oxide is intended to insure adequate surface stabilization of the tungsten oxide.

Preferably, the basic metal oxide will be present in an amount from 70 to 100 percent by weight of the tungsten oxide and most preferably will be present in an amount of 100 percent by weight of the tungsten oxide.

In general, adequate surface stabilization of the tungsten oxide will occur if the ratio of tungsten oxide to basic metal oxide is from 1:30 to 10:1. However, preferably the ratio will be from 1:20 to 20:3 and most preferably will be a one to one ratio.

While the noble metals, i.e., silver, gold, palladium, platinum, iridium, rhodium, and ruthenium, may be incorporated herein, it is preferred that the noble metal be selected from the group consisting of palladium, platinum, rhodium, ruthenium, and iridium mixtures there.

While more than one noble metal may be incorporated into the catalyst of the invention, it is further preferred that the total noble metal composition be selected from the following weight percents of total noble metal: 50–100 percent palladium, 0–20 percent of the combination of rhodium, ruthenium and iridium, and 0–50 percent platinum. Note that while the 0–20 percent of rhodium, ruthenium and iridium may be comprised solely of rhodium or ruthenium or iridium, preferably the total combined weight of rhodium, ruthenium and iridium should equate to no more than 20 percent of the total noble metal present.

It is most preferred that the noble metal be 100% palladium. Suitable palladium precursors are palladium salts soluble in aqueous and/or organic solvents. Examples include palladium chloride, palladium sulfate, tetraamine palladium (II) chloride, diammine palladium (II) hydroxide, and palladium acetate.

The noble metal, whether comprised of one or more metals as discussed above, should be present in an amount from 0.5 to 5 percent by weight of the composite oxide. As previously defined, the composite oxides are comprised of the total weight of the refractory inorganic oxide, the tungsten oxide, and the basic metal oxide. Unlike the composite oxide, the noble metal is present in and calculated on an elemental basis.

Preferably, the noble metal will be present in an amount from 0.75 to 4 weight percent by weight of composite oxide and most preferably will be present in an amount from 1 to 3 percent by weight of composite oxide.

Most preferably, the catalyst of the instant invention will be comprised of gamma alumina, ten percent tungsten oxide, ten percent lanthanum oxide and one percent palladium. It will be appreciated by those skilled in the art that most preferably the tungsten oxide and basic metal oxide will be present in a one to one ratio.

Table 1 illustrates both the suitable and preferred quantitative ranges for the components of the composite catalyst described herein. Note that components A, B, & C comprise the composite oxide upon which component D, the noble metal, is arrayed.

TABLE 1

| Component | Suitable Quantitative Ranges | Preferred Quantitative Ranges |
|---|---|---|
| A. refractory inorganic oxide | As desired | As desired |
| B. tungsten oxide | 1–30% by wt of component A | 5–15% by wt of component A |
| C. basic metal oxide | 30–100% by wt of component B but no less than 3% by wt of component A | 70–100% by wt of component A but no less than 3% by wt of component A |

TABLE 1-continued

| Component | Suitable Quantitative Ranges | Preferred Quantitative Ranges |
|---|---|---|
| D. noble metal | 0.5–5% by wt of total wt of components A, B and C | 1–3% by wt of total wt of components A, B and C |

The process of reducing certain exhaust gases comprises intimately contacting such gases with the catalysts of the invention. Those skilled in the art will appreciate that the process of using the catalyst of the instant invention may be accomplished by arranging said composite oxide upon a substrate such as those known in the art.

While the invention is primarily concerned with a novel combination of various metal containing compounds designed to provide increased catalytic activity with long term operational durability, those skilled in the art will appreciate that the invention may be used in conjunction with a suitable substrate. If such a substrate is used, it is most preferred that the substrate be a monolithic substrate having a honeycomb structure through which exhaust gases may pass. The honeycomb structure may have either square, hexagonal, tetragonal, triangular or corrugated channels or conduits. Other suitable substrates include pelletized materials.

Suitable substrates may be ceramic or metallic. Preferred are ceramic substrates. Suitable examples are cordierite, alumina, mullite, porcelain, boron or silicon carbides of which cordierite is most preferred.

Suitable metallic substrates may be produced from alloys of iron, nickel and chromium or those produced from alloys of iron, chromium, aluminum and cobalt or those produced from alloys of iron, chromium, and aluminum. Other metallic substrates may be comprised of carbon steel or cast iron.

Due to the necessity to surface stabilize the tungsten oxide, the process of preparing the catalyst disclosed herein is best achieved with the deposition of the various precursors occurring via the incipient wetness technique. By this is meant using a volume of precursor solution sufficient only to thoroughly wet the surface to be impregnated. This technique is advantageous in that it (1) provides easier control of metal loading, (2) is less labor intensive and (3) produces negligible waste.

Preparation of the catalyst of the instant invention begins with the contacting of the refractory inorganic oxide with the tungsten oxide precursor solution. After the refractory inorganic oxide has been impregnated with the tungsten precursor solution using the incipient wetness technique, the resulting material is first dried and then calcined to obtain tungsten oxide.

In order to promote complete surface stabilization of the acidic tungsten oxide, the tungsten oxide/gamma-alumina composite oxide is next contacted with the basic metal oxide precursor solution, then dried and calcined. The resulting composite oxide is then contacted with a noble metal solution of sufficient volume so as to utilize the incipient wetness technique. The resulting material is dried and calcined to obtain the catalyst of the invention.

In the case of catalysts with monolithic substrates, multiple impregnation steps may be required. However, the methodologies applied in the case of powder substrates apply in the case of monolithic substrates as well.

Of course, those skilled in the art will appreciate that other methods of depositing the various precursor solutions, such as wet impregnation, are within the scope of the invention.

The following examples are provided to illustrate the invention but are not intended to limit the invention. All degrees are in centigrade and all parts are by weight percent unless otherwise indicated.

EXAMPLE 1

Preparation of Catalyst According To The Present Invention

Catalyst A

Gamma-$Al_2O_3$ (10 g) was contacted with an ammonium meta tungstate solution (12 $cm^3$) of desired concentration to deposit the W precursor by incipient wetness. The W solution was added drop-wise with continuous mixing to thoroughly wet the alumina surface. The resulting entity was first dried at 120° C. for 1 hour and then calcined at 500° C. for 4 hours. The composite oxide had a $WO_3$ loading of 10 percent.

The 10 percent $WO_3/Al_2O_3$ (11 g) was contacted with a lanthanum nitrate solution (13.2 $cm^3$) of desired concentration to deposit the La precursor by incipient wetness. The La solution was added drop-wise with continuous mixing to thoroughly wet the $WO_3/Al_2O_3$ composite oxide surface. The resulting entity was first dried at 120° C. for 1 hour and then calcined at 500° C. for 4 hours. The composite oxide had a $La_2O_3$ loading of 10 percent.

The 10 percent $La_2O_3/10\% \ WO_3/Al_2O_3$ composite oxide (12.1 g) was contacted with a palladium nitrate solution (14.5 $cm^3$) of desired concentration to deposit the Pd precursor by incipient wetness. Again, the Pd solution was added drop-wise with continuous mixing to thoroughly wet the surface of the composite oxide.

The resulting entity was first dried at 120° C. for 1 hour and then calcined at 600° C. for 6 hours. The catalyst obtained had a Pd loading of 1 percent.

EXAMPLE 2

Flow Reactor Evaluation

Catalyst A was evaluated using an integral reactor. The reactor consisted of a 0.75" diameter pyrex glass tube. The activity of the catalyst (sample 0.2 g) was evaluated in a simulated vehicle exhaust stream at 550° C. Nitrogen was used a s t he carrier gas. The feed gas flow rates were controlled using mass flow controllers. The concentrations of nitric oxide (NO), carbon monoxide (CO), hydrocarbons (HC) such as propylene ($C_3H_6$) and propane ($C_3H_8$), and oxygen ($O_2$) were measured using chemiluminescence, infra-red, flame ionization, and membrane cell detectors, respectively.

The simulated exhaust gas consisted of 1000 ppm NO, 15,000 ppm CO, 5,000 ppm $H_2$, 20 ppm $SO_2$, 1000 ppm $C_3H_6$, 500 ppm $C_3H_8$, and variable amounts of $O_2$. Propylene and propane were used to simulate the fast burning and slow burning hydrocarbons in the vehicle exhaust. The oxygen concentration was varied to change the redox ratio (R) of the gas. The redox ratio (R) is the ratio of the reducing components to the oxidizing components in the feed gas. The redox ratio varies with changes in the operating air/fuel ratio of the engine (such as during changes in the operation of the engine for one mode to the other, i.e., idle to acceleration to coast to deceleration). The R value of the catalyst feed gas was calculated from the partial pressures of the components as shown below:

$$R=[CO+H_2+9C_3H_6+10C_3H_8]/[NO+2O_2]$$

The CO, NO, and HC conversions (percentages) were determined using the formula:

$$C=[(B-A)/A]*100$$

where A is the concentration of the pollutant in the feed gas (entering the catalyst), B is the concentration of the pollutant in the exit gas (leaving the catalyst), and C is the conversion in percent. The HC conversions were measured as a function of the redox ratio.

TABLE 2

|  | Redox Ratio (R) | | | | |
| --- | --- | --- | --- | --- | --- |
| Conversion | 0.9 | 1.0 | 1.1 | 1.4 | 1.8 |
| HC | 90 | 84 | 80 | 74 | 65 |

The above results indicate that the hydrocarbon conversion of the catalyst of the instant invention is significantly higher than that of the prior art catalysts. The presence of basic metal oxide, $La_2O_3$, in catalyst A stabilizes the tungsten oxide while simultaneously providing for increased catalytic activity for hydrocarbon exhaust gases.

While the best modes for carrying out the invention have been described in detail, those familiar with the art to which the invention pertains will recognize alternative designs and embodiments for practicing the invention as defined by the following claims.

We claim:

1. A catalyst for promoting oxidation-reduction reactions with the exhaust gases produced by an internal combustion engine comprising:
   a composite oxide comprised of:
      a refractory inorganic oxide;
      tungsten oxide in juxtaposed relation with the refractory inorganic oxide; and
      a basic metal oxide having a $pH_{pzc}$ greater than tungsten oxide, wherein no more than 35 weight percent of the total weight of the basic metal oxide is present in the refractory inorganic oxide; and
   arrayed on the composite oxide a noble metal.

2. The catalyst of claim 1 wherein the tungsten oxide is present in an amount from 1–30% by weight of the refractory inorganic oxide.

3. The catalyst of claim 2 wherein the basic metal oxide is present in an amount from 30–100% by weight of tungsten oxide but is not less than 3% by weight of the refractory inorganic oxide.

4. The catalyst of claim 3 wherein the basic metal oxide is lanthanum oxide.

5. The catalyst of claim 3 wherein the noble metal is present in an amount from 0.5–5% by weight of composite oxide.

6. The catalyst of claim 5 wherein the noble metal is selected from the group consisting of palladium, ruthenium, rhodium, platinum, iridium and mixtures thereof.

7. A process reducing the emission of exhaust gases produced by an internal combustion engine comprising:
   passing the exhaust gases over a catalytic element comprising a monolithic substrate having a refractory inorganic oxide arrayed thereon, and deposited upon said substrate a catalyst comprising:

tungsten oxide;
a basic metal oxide having a $pH_{pzc}$ greater than tungsten oxide; and
a noble metal,
wherein at least 51 weight percent of the total weight of the basic metal oxide is present as a separate layer in juxtaposed relation to the tungsten oxide, and wherein the catalyst is a composite oxide comprised of the refractory inorganic oxide, the tungsten oxide in juxtaposed relation with the refractory inorganic oxide and the basic metal oxide in juxtaposed relation with the tungsten oxide, wherein no more than 35 weight present of the total weight of the basic metal oxide is present in the refractory inorganic oxide.

8. The process of claim 7 wherein the noble metal is arrayed on the composite oxide.

9. A process for making a catalyst for promoting oxidation-reduction reactions with the exhaust gases produced by an internal combustion engine comprising:

providing a refractory inorganic oxide deposited on a monolithic substrate;

contacting the refractory inorganic oxide with a tungsten containing compound and calcining to make a tungsten oxide treated material;

contacting the tungsten oxide treated material with a basic metal precursor and calcining to make a basic metal oxide treated material, wherein the basic metal oxide has a $pH_{pzc}$ greater than tungsten oxide and the refractory inorganic oxide contains no more than 35 weight percent of the total weight of the basic metal oxide; and contacting the basic metal oxide treated material with a noble metal containing compound and calcining.

10. The process of claim 9 wherein the ratio of tungsten oxide to basic metal oxide is from 1:30 to 10:1.

11. The process of claim 10 wherein the noble metal is present in an amount from 0.5–5% by weight of the basic metal oxide treated material.

* * * * *